(12) United States Patent
Gai

(10) Patent No.: US 7,197,809 B2
(45) Date of Patent: Apr. 3, 2007

(54) METHOD FOR FABRICATING AN HELICAL STRANDED CABLE, PARTICULARLY FOR MECHANICAL MOTION TRANSMISSION, AND CABLE PRODUCED BY THAT METHOD

(75) Inventor: Giorgio Gai, Busalla (IT)

(73) Assignee: Ultraflex SpA

( * ) Notice: Subject to any disclaimer, the term of this patent is extended or adjusted under 35 U.S.C. 154(b) by 0 days.

(21) Appl. No.: 11/033,978

(22) Filed: Jan. 12, 2005

(65) Prior Publication Data
US 2006/0032661 A1  Feb. 16, 2006

(30) Foreign Application Priority Data
Jan. 12, 2004  (IT) ............. SV2004A0001

(51) Int. Cl.
*B21D 39/00* (2006.01)
*B23P 11/00* (2006.01)

(52) U.S. Cl. ............... 29/508; 29/510; 72/76

(58) Field of Classification Search ............ 29/508, 29/510, 511, 515, 516, 505; 72/76, 402
See application file for complete search history.

(56) References Cited

U.S. PATENT DOCUMENTS

| | | | | |
|---|---|---|---|---|
| 251,114 A * | 12/1881 | Hallidie | ............... | 57/215 |
| 1,943,087 A * | 1/1934 | Potter et al. | ............... | 174/107 |
| 2,978,860 A * | 4/1961 | Campbell | ............... | 57/215 |
| 3,083,817 A * | 4/1963 | Campbell | ............... | 57/311 |
| 3,130,536 A * | 4/1964 | Peterson et al. | ............... | 57/9 |
| 3,131,469 A * | 5/1964 | Glaze | ............... | 228/136 |
| 3,135,139 A * | 6/1964 | Kralowetz | ............... | 72/76 |
| 3,234,722 A * | 2/1966 | Gilmore | ............... | 57/215 |
| 3,355,544 A * | 11/1967 | Costley et al. | ............... | 174/106 R |
| 3,383,704 A * | 5/1968 | Schoerner et al. | ............... | 57/215 |
| 3,823,542 A * | 7/1974 | Pemberton | ............... | 57/15 |
| 4,311,001 A * | 1/1982 | Glushko et al. | ............... | 57/215 |
| 4,722,216 A * | 2/1988 | Fencl | ............... | 72/402 |
| 5,542,278 A * | 8/1996 | Aleksandrovich et al. | ............... | 72/371 |
| 5,640,766 A * | 6/1997 | Fujino et al. | ............... | 29/872 |
| 6,137,060 A * | 10/2000 | Avellanet | ............... | 174/128.1 |
| 6,313,409 B1 * | 11/2001 | Bales et al. | ............... | 174/128.1 |
| 6,449,834 B1 * | 9/2002 | Bales et al. | ............... | 29/825 |
| 6,748,655 B2 * | 6/2004 | Dickmann et al. | ............... | 29/888.061 |
| 2002/0017123 A1 * | 2/2002 | Wieser | ............... | 72/402 |
| 2004/0139781 A1 * | 7/2004 | Rozhdestvenskiy et al. | ............... | 72/377 |

* cited by examiner

Primary Examiner—David P. Bryant
Assistant Examiner—Christopher M. Koehler
(74) Attorney, Agent, or Firm—James Creighton Wray

(57) ABSTRACT

A method for fabricating a stranded cable particularly for mechanical motion transmission, which cable is composed of multiple strands or wires, helically wound around a common longitudinal axis, including the steps of:
  a—winding the strands that form the cable in a helical arrangement around a common longitudinal axis,
  b—flattening and smoothing the exterior profile of the each strand of the cable. Cable produced by that method.

9 Claims, 3 Drawing Sheets

METHOD FOR FABRICATING AN HELICAL STRANDED CABLE, PARTICULARLY FOR MECHANICAL MOTION TRANSMISSION, AND CABLE PRODUCED BY THAT METHOD

This application claims the benefit of Italian Application No. SV2004A00001 filed Jan. 12, 2004.

Italian Application No. SV2004A00001 filed Jan. 12, 2004 is hereby incorporated by reference in its entirety.

BACKGROUND OF THE INVENTION

The present invention relates to a helical stranded cable, particularly for mechanical motion transmission, which is composed of multiple strands or wires, helically wound around a common longitudinal axis, said cable being covered with an external jacket (2).

Such devices are well known in the art and widely used. While these devices satisfactorily serve their function, they still suffer from certain drawbacks.

Prior art stranded cables are typically composed of ten or more strands helically wound around a common longitudinal axis, to form the final cable. The great number of strands, or wires, involves a few drawbacks: first, the helicoid generated by the strands will have as many helical blades as strands, hence in prior art sheathed cables there will be at least as many points of tangency between the cable and the sheath as the strands or wires of the cable. Particularly, it shall be noted that in prior art cables, a greater number of strands or wires increasingly approximates a circumferential profile, hence the points of contact with the sheath associated to the cable increase with the number of strands, maintaining in any case a gap between two consecutive points of tangency of two different strands. The number of gaps increases (as the number of strand increases, and it has been found that the presence of those gaps together with the natural elasticity of the strands wounded in a cable and of the sheath leads to have one shock-like contact per one gap while the cable is moving inside the sheath for example while the cable is moving for mechanical motion transmission.

As to define the shock-like contact, the shock-like contact is that particular kind of contact that arises when two surfaces having different speed vectors became in contact each other. It has to be understood that effects of a shock-like contact becomes higher when the contact surface is smaller, as a matter of fact for the same condition of the speed vectors, if the contact surface or contact area is smaller and the force is the same, consequently the corresponding pressure in the contact area is higher. This leads furthermore to an higher wear in the contact surfaces. It has to be further noted that a punctual contact surface has the maximum of shock-like contact, having maximum pressure between the contacting surfaces and it implies maximum of wear in the contacting surface.

A number of drawbacks arise from this: first, a greater number of shock-like contacts between the cable and the sheath due to a greater points of contact, or so-called points of tangency, between the cable and the sheath, together with the presence of the aforementioned gaps, and natural elasticity, causes an increased wear of the cable and/or sheathe. Due to such wear, the cables usually have a reduced life, therefore they often have to be oversized to such an extent as to have a life suitable to the application for which they are designed.

Oversizing can be effected essentially in three possible ways: increasing the diameter of each strand, increasing the number of strands, or improving the mechanical properties of the cable material. These three typical arrangements involve three respective drawbacks: when the strand diameter is increased, the cable has a higher manufacturing cost and a heavier weight, and further requires a sheath of greater diameter, which increases the weight of the whole assembly. Therefore, the cable that is so oversized is not suitable for low-cost applications.

The arrangement with a greater number of strands involves the above mentioned drawbacks and makes the problem of the shock-like contact between the cable and the sheath even more noxious, by incrementing the number of gaps and therefore the number of shock-like contacts between the cable and the sheath, by incrementing the number of the punctual surfaces of the cable that came in contact with the sheath surface.

Furthermore the arrangement with a greater number of strands poses a problem associated to an increased flexibility of the cable, especially when subjected to pushing, whereby the cable is poorly effective in transmitting longitudinal efforts causing the cable to be pushed.

The prior art arrangement that provides an improvement of the mechanical properties of the cable allows to substantially keep the cable and sheath sizes unchanged, but is often rejected, because it causes an exponential increase of cable costs. Indeed, for driving signal transmission, the mechanical cable solution is usually preferred to the oil hydraulic solution, for a manufacturing and installation cost advantage, and in this arrangement the low cost advantage of the mechanical solution would be lost.

It shall be further noted that in prior art cables a lubricant is often used in combination with the cable jacket, to lubricate the inside of the cable thereby dramatically reducing friction between the cable and the sheath. The lubricant is often introduced from the end of the cable through which the cable is inserted in the sheath, so as to preserve the inside of the sheath from any infiltration of dust and/or dirt, which would further increase friction. Nevertheless, the lubricant in prior art cables cannot reach the very longitudinal center of the sheath and/or the end opposite the insertion end, because the lubricant is applied at a substantially very low pressure. Therefore, in prior art cables, the highest friction is found at the center point of the longitudinal extension of the sheath or at the end opposite the cable insertion end, which is therefore poorly lubricated.

A further prior art arrangement consists in covering the cable with intrinsically lubricating, or self-lubricating materials, such as PTFE (also known with the commercial name Teflon®). PTFE spreads over the inner surface of the sheath, due to friction, and keeps the cable lubricated. Nevertheless, this arrangement has a high implementation cost, due to the high cost of PTFE, and more generally of all self-lubricating materials, and is actually feasible only in few application cases. Furthermore, due to the high cost of self-lubricating materials, the surface cover made of these materials is very thin due to money saving requirements.

An object of this invention is to provide a helical stranded cable, particularly for mechanical motion transmission, which may simply and inexpensively obviate the drawbacks of prior art helical stranded cables particularly for mechanical motion transmission.

Furthermore prior art cable construction method provides the simple action of winding the strands helically around a common longitudinal axis, to form the final cable. Such a known construction method leads to form a cable that does not work efficiently in compression: the different strands, during compression tends to move away from each other and consequently the cable shows a sort of spring effect before transmitting the signal. The prior art cables made by the above mentioned simple winding method furthermore implies another related problem: the whole length of the cable is slightly shortened during the compression due to the spring effect.

Furthermore the prior art cable built by the prior art construction method presents another problem due to the fact that the strand wound together shows an exterior perimeter which has its profile made by the juxtaposition of the singles round profile of the different strands, this leading to have shock-like punctual contact between the cable and the sheath.

Another object of this invention is to provide a helical stranded cable production method, which may simply and inexpensively obviate the drawbacks of prior art helical stranded cables production method.

SUMMARY OF THE INVENTION

The invention fulfils the above objects by providing a helical stranded cable, particularly for mechanical motion transmission, composed of multiple strands or wires which are helically wound around a common longitudinal axis, said cable being covered with an outer jacket, characterized in that said strands or wires are less than ten in number, preferably less than seven, and are helically wound to form said cable.

The smaller number of wires, particularly in the preferred arrangement with three strands or wires, affords a number of advantages. After many tests, it was found that the smaller number of strands results in a smaller number of points of contact between the cable and the sheath associated therewith. Therefore, the points of contact, i.e. the helical lines of contact between the cable and the sheath have a small extension, therefore they generate a lower friction, but it has to be noted that it leads to have as many linear or punctual contacting surfaces as the number of strand.

As is apparent, a helix with a small number of paddles has an accordingly small number of points of contact with the sheath associated therewith.

A part from hammering that will be described better hereinafter, other production methods that have been found useful are rolling, drawing or wire-drawing, hot drawing, extrusion, lamination.

The above mentioned operation of hammering, rolling, drawing or wire-drawing, hot drawing, extrusion, lamination, furthermore implies a mechanical adhesion between the strands of the cable, straining or deforming the contacting surface between the strand so as to flatten the contacting surfaces itself and bringing the contacting surfaces between the strand from lines to areas.

The cable so obtained may be advantageously used to transmit motion either by pulling or by pushing, thanks to the fact that the smaller number of strands, provides the cable of the invention with a good flexibility as well as an optimized behavior in both longitudinal directions of stress on the cable during pulling and/or pushing motion transmission.

According to the production method for the cable according to the present invention it has been found that by hammering the cable strands before, during or after the winding proceeding another main advantages is achieved: the cable shows an exterior profile substantially corresponding to the interior profile of the sheath associated therewith, these reducing the number of punctual contacting surfaces into continuous contacting areas all along the cable. In these way the number of the strand can be low, and the contacting surface are low in number and wide in extension, so as to reduce the shock-like contact, and to reduce the wear of the contacting surfaces, that shows contacting surfaces in form of an helix all along the cable length.

A part from hammering that will be described better hereinafter, other production methods that has been found useful are rolling, drawing or wire-drawing, hot drawing, extrusion, lamination.

In all these construction methods the exterior profile of the helix is reduced from the initial profile of the helix made by simply winding the strands, and the exterior profile of the helix is softened, flattened and smoothened so as to acquire a profile substantially correspondent to the interior profile of the sheath, having substantially the same radius of curvature of the sheath, if no jacket is present. If the jacket is present the situation is nearly analogue, because the jacket has an outside perimeter that is substantially similar to the wounded strands of the cable.

In order to obtain such a profile it is recommendable to use hammer having proper profile, or being placed during hammering in predetermined areas with respect to the cable, as hereinafter described.

By hammering the cable, the diameter of the cable is reduced, the strands being deformed and squeezed against each other. As described by squeezing the strands together and deforming the section thereof, a cable is obtained that has a stiffer behavior, so that, when it is subjected to a longitudinal pushing stress, the cable does not tend to open or to absorb a part of the stress, as a spring, but it tends to transmit said pushing stress as if it were a rigid rod, while maintaining the flexibility required from cables.

The cable of this invention provides, in a preferred embodiment, the use of three strands or wires having a substantially circular section before hammering and the same diameter, and in which the respective centers of the circumferences of the strands or wires are at the vertices of an equilateral triangle, the center of gravity of such equilateral triangle corresponding to the longitudinal winding axis of the helicoid formed by the three strands or wires.

If the cable of this invention were made of more than three wires, i.e. four, five up to substantially ten wires, the respective centers of the circumferences of the strands or wires might be expected to be, as seen in cross section, at the vertices of a regular polygon, the center of gravity of such regular polygon corresponding to the longitudinal winding axis of the helicoid formed by the three strands or wires.

The sheath associated to the cable of the present invention has an inside diameter that is about equal to the diameter of the cylindrical envelope defined by the cross section of the cable, therefore, for every cross section, said sheath and said cable have a number of surfaces or areas of mutual contact which is substantially equal to the number of strands or wires, and definitely smaller than in prior art cables. The above cable overcomes the following problem: due to the great number of the strands or wires that compose prior art cables, the section thereof approximates a circumference, therefore a great number of punctual areas of contact exist between the cable and the sheath, which causes a high friction due to the large number of punctual contacting surfaces and high wear due to the fact that contacting areas are punctual.

In the preferred embodiment of a cable composed of three wires having the same diameter, the respective centers of the circumferences of the strands or wires, when seen in cross section, are at the vertices of an equilateral triangle, the center of gravity of such equilateral triangle corresponding to the longitudinal winding axis of the helicoid formed by the three strands or wires.

According to a further construction characteristic, the cable of this invention is covered with a jacket, which has the same helical profile as the wound strands that compose the cable, hence it has a small number of areas of contact with the sheath, as described above. Furthermore, thanks to the fact that the cable jacket follows such helical profile, a chamber is formed between two adjacent wires and the inner surface of the sheath, which chamber has a helical arrangement along said cable, and is referred to as helical chamber. The helical chamber extends along the whole longitudinal extension of the cable in a helical arrangement all along the sheath and/or the cable, and according to a further characteristic of this invention, at least one of these helical chambers may contained or be supplied with a fluid lubricant. Thus, the surface of each strand or wire facing toward the corresponding helical chamber acts as a feeding/spreading surface for the fluid lubricant contained in the associated helical chamber.

Essentially, due to the relative motion between said cable and said sheath, each helical chamber containing said fluid lubricant acts as a fluid lubricant pumping/distributing chamber. Hence, prior art drawbacks associated to an uneven distribution of the fluid lubricant along the whole extension of the cable are obviated.

Furthermore by hammering the cable during construction it has been noted that the efficiency of said feeding/spreading surface for the fluid lubricant and consequently the efficiency of said fluid lubricant pumping/distributing chamber is greatly improved.

First, the sealing edge of said fluid lubricant pumping/distributing chamber, between the strand, or the corresponding part of the jacket, and the sheath itself shows an improved thickness, being substantially thick at least as half of a diameter of a single strand, while in the prior art cable, without hammering, the sealing edge of said fluid lubricant pumping/distributing chamber is very thin, being made by the punctual contact between the strand, or the corresponding part of the jacket and the sheath.

Second, the profile of the said feeding/spreading surface in the direction of said fluid lubricant pumping/distributing chamber after hammering is flattened, so as to improve the effect of the pumping action.

Also, the use of a cable according to this invention, allows to overcome prior art problems related to the great number of points of contact between the sheath and the cable. By using a cable according to the invention, a cable and sheath coupling may be obtained with only areas of contact, instead of punctual contacting surfaces, hence a lower friction and wear for the above mentioned reasons. This further improves the ability of the cable to slide inside the sheath, even when no fluid lubricant is provided.

Therefore, the cable of the present invention obviates prior art drawbacks involving the use of better or oversized materials as compared with actual application requirements. Indeed, thanks to its lower friction, the cable of the invention allows to strictly use the materials and sizes that are determined by typical calculations related to the ability to exceed the mechanical stress, without substantially requiring any oversizing for wear resistance.

The cable of this invention is particularly useful for all applications in which the relative motion between the cable and the sheath is particularly frequent, e.g. in steering devices and devices for the transmission of frequently varying driving signals. In these applications, the wear of conventional cables is particularly critical, and involves the provision of further oversizing and extra-lubrication. Furthermore, in case of frequent and fast relative motions between the cable and the sheath, one more drawback becomes critical, i.e. the heating of the cable and sheath material due to friction. Such heating involves an increase, though small, of the cable diameter, which is less cooled than the sheath, as it is inside the sheath and is not cooled by ambient air. The diameter increase induced by heating may be expected to cause an increase of friction which will heat the cable, in a sort of chain reaction, may lead to the failure of the cable and/or to the seizure of the cable within the sheathe.

Conversely, in the cable of this invention, the helical chambers formed between the cable and the sheath may not only be useful for a better distribution of the lubricant but for using the lubricant as a cooling liquid. On the one hand, such better distribution of the lubricant, due to the relative motion between the sheath and the cable, considerably reduces friction, and heating resulting therefrom. On the other hand, the fluid lubricant may be also used as, or wholly replaced by, a fluid coolant. Here, the fluid that is introduced in the helical chambers is distributed all along the cable, thanks to the peripheral surface fronts of the strands, whose radial depths, with respect to the maximum radius of the envelope cylinder of the cable are such that said peripheral surface fronts, facing substantially forward with reference to a cable sliding direction, form convex helical paddles for distributing the lubricant between the points of tangency of the cable and the inner surface of the sheath. The paddle fronts generated thereby are convex and proportionally get closer to the sheath surface while exerting a compression force on the fluid lubricant as the cable slides inside the sheath. Thus, the fluid lubricant and/or coolant is evenly distributed inside the sheath, so that the friction between the cable and the sheath decreases, and the surfaces are also evenly cooled.

It shall be noted that, even when no fluid lubricant/coolant is provided between the cable and the sheath, the air within the helical chambers helps to provide a better cable cooling effect than in prior art cables.

In a preferred embodiment, the helical paddle fronts generated on the cable according to the invention extend along a portion of the whole radius of the inner cavity of the sheath and/or of the maximum radius of the cavity, from a maximum 50% to a minimum 10% of said maximum radius of the cavity and/or the radius of the cylindrical envelope defined by the cross section of the cable.

A further advantage of the invention is noted, resulting from the additional possibility, due to the fluid coolant or lubricant distribution by the helical chambers, of using such fluid for removing wear material or dirt that builds up in said chambers and/or between the cable and the sheath.

In accordance with a further preferred embodiment, the cable of this invention may be comprised of a number of strands or wires other than three, preferably smaller than ten, so as to obtain a small number of lines of contact with the associated sheath, and peripheral helical chambers for housing/distributing lubricant as well as helical surfaces for feeding/distributing said lubricant, which are substantially in the same number as the strands or wires.

An advantageous embodiment of the cable of this invention also provides strands or wires having different diameters, which may be advantageously selected from equal or different materials, depending on the use for which the cable is designed, which actually allows to cable to be used in a number of fields or applications.

Furthermore, these strands or wires are preferably made of stainless steel, whereas the jacket of the cable is made of plastic. This provides the advantage of using substantially inexpensive materials, such as plastic, instead of PTFE (or Teflon®) for the cable jacket. Nevertheless, PTFE may be still used as a jacket, thereby providing added smoothness to the inventive cable, as compared with prior art cables.

The present invention also relates to the method for fabricating a stranded cable as described above, and characterized in that it includes the following steps: a—winding the strands that form the cable in a helical arrangement around a common longitudinal axis, b—flattening and smoothing the exterior profile of the each strand of the cable.

In a preferred embodiment step b.—is obtained by hammering and/or rolling, drawing or wire-drawing, hot drawing, extrusion, lamination the cable and or of the strands and furthermore it is provided a step of wrapping the cable so obtained in a jacket.

Hammering and/or rolling, drawing or wire-drawing, hot drawing, extrusion, lamination the cable and or of the strands, modify the exterior profile of the cable and/or of the strands and or of the jacket so as the exterior profile of the cable assumes the radius of curvature of the interior surface of the sheath, or a radius of curvature near to the radius of curvature of the interior surface of the sheath.

Particularly it has been provided a method comprising the following steps of: winding the strands that form the cable in a helical arrangement around a common longitudinal axis, hammering the cable in two or more directions perpendicular to the longitudinal axis by using hammering sectors shaped like a sector of a circumference until the average diameter of the cable after hammering is reduced to a diameter smaller than the average diameter of the cable before hammering and wrapping the cable so obtained in a jacket.

Hammering is carried out at two or more than two, preferably more than four surfaces, placed along sector of a circle around the cable, and acting in radial directions; after hammering, the strands or wires are squeezed against each other substantially at the contact areas or near the latter.

The hammers can have different profiles, as they can be flat and planar, or they can have a concave profile. Particularly it has been found that it can be very useful to have concave hammer profile, said hammers having different radius of curvature along their extension.

Furthermore hammers can rotate around the cable during hammering, in order to have a complete hammering of the cable.

Further characteristics and improvements will form the subject of the claims appended hereto.

The characteristics of the invention and the advantages derived therefrom will be more apparent from the following detailed description of the detailed figures, in which:

DETAILED DESCRIPTION OF THE PREFERRED EMBODIMENTS

Figure 7:
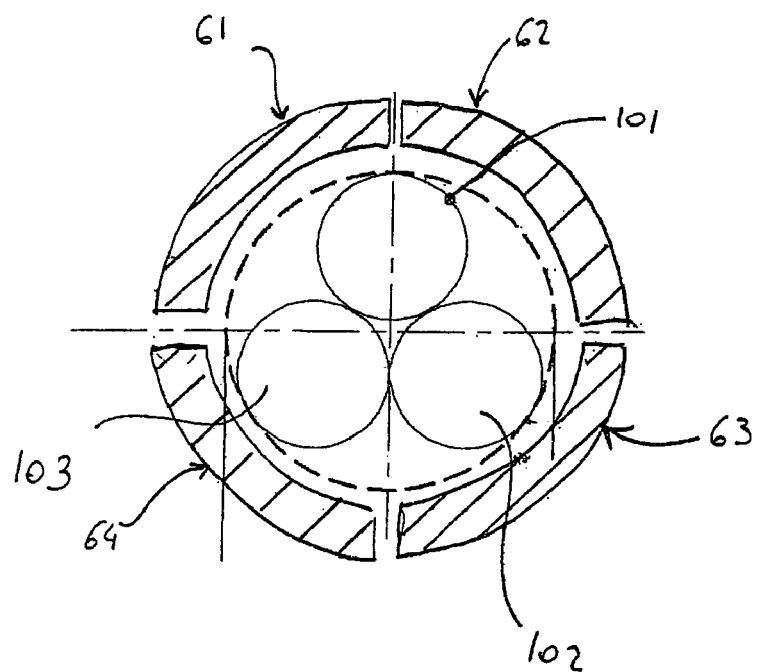
FIG. 7 shows the hammering areas for the fabrication of a cable according to the present invention.

The cable of the present invention is manufactured by winding the strands or wires 101, 102, 103 that form the cable 1 in a helical arrangement around a common longitudinal axis. Then, in a preferred embodiment the cable is hammered in two or more directions perpendicular to the longitudinal axis, and then wrapped in a jacket 2. Particularly, a preferred fabrication method, as shown in FIG. 7, provides hammering of the cable in four directions perpendicular to the longitudinal axis at hammering sectors 61, 62, 63, 64 having the shape of sectors of a circumference that cover 90° each, until the average diameter of the cable after hammering is reduced to a diameter that may be initially equal to 80% to 99.9% of the average diameter of the cable before hammering.

The hammers can have different profiles, as they can be flat and planar, or they can have a concave profile. Particularly it has been found that it can be very useful to have concave hammer profile, said hammers having different radius of curvature along their extension.

Particularly such reduction may be such as to obtain an average diameter of the cable equal to 85% to 95% of the average diameter of the cable before hammering. In a preferred exemplary embodiment, the diameter reduction is such that the cable after hammering has a diameter of about 92% of the average diameter of the cable before hammering.

The, application of the outer jacket, in a particular embodiment of a plastic jacket, is carried out, according to a preferred method, by passing the cable through an extruder supplied with plastic material and/or PTFE. Hence, the tree strands or wires 101, 102, 103 are covered with the jacket 2.

Figure 1:
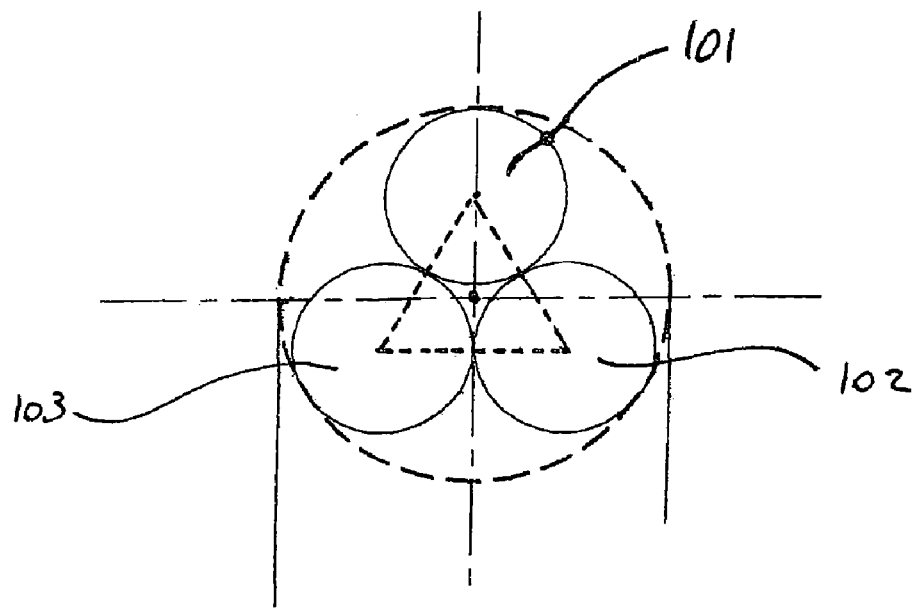
FIG. 1 is a sectional view of the wires of the cable of the present invention before hammering.
Figure 2:
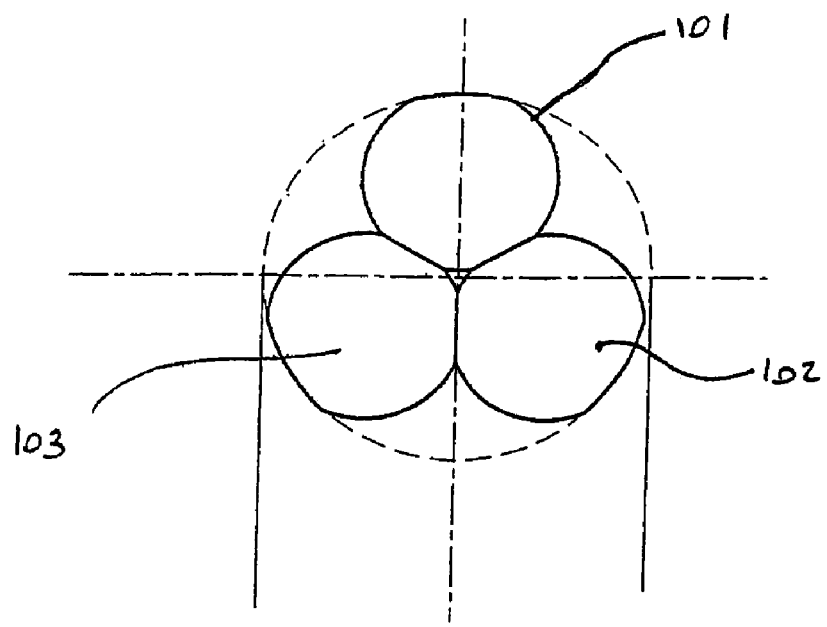
FIG. 2 is a sectional view of the wires of the cable of the present invention after hammering.

It shall be noted that, by virtue of hammering, the section of the strands is squeezed, and is substantially changed from the section as shown in FIG. 1, in which the strands 101, 102, 103 are simply side-by-side, to a section as shown in FIG. 2, in which the three strands have contact lines and are squeezed both along the outer edges and along the contact edges. Generally, hammering is effected at two or more concave surfaces, forming as many sectors of a circle, and acting in a radial direction, which surfaces form together a substantially circular surface.

Figure 3:
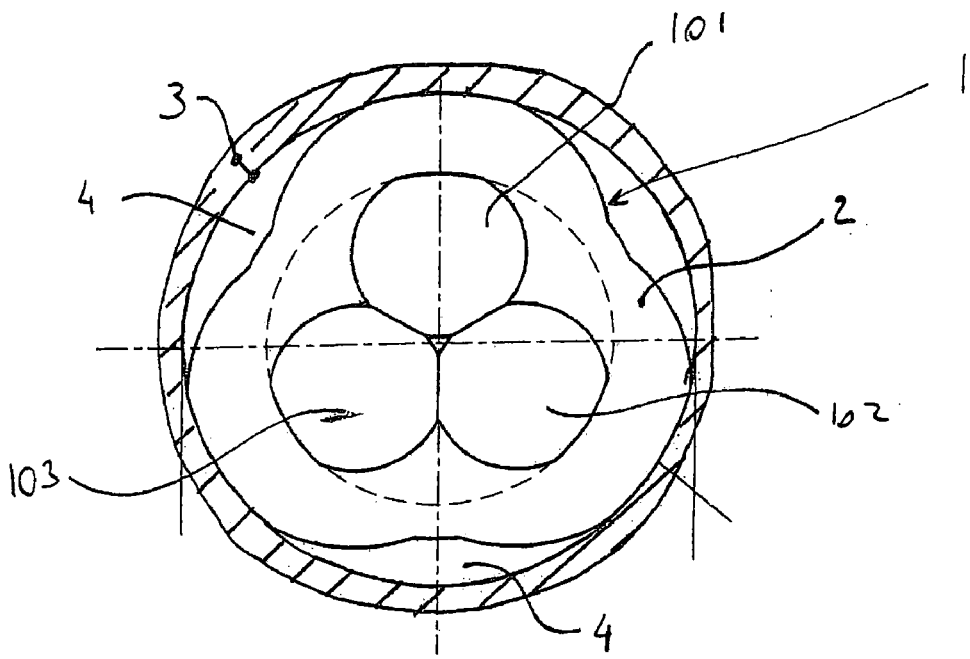
FIG. 3 is a sectional view of the wires of the cable of the present invention after hammering and application of the jacket.

Later, by virtue of the application of plastic and/or PTFE, the three strands or wires are covered with the jacket 2, as shown in FIG. 3, in the particular preferred embodiment of a three strand cable.

All the figures show a preferred embodiment in which the strands or wires are three in number, have the same diameter, and are helically wound to form the cable, but they can be provided in a greater number, though within certain limits, so as to have a small number of lines of contact with the sheath. The cable of this invention is particularly useful for all applications in which the relative motion between the cable and the sheath is particularly frequent, e.g. in steering devices and devices for transmitting frequently varying driving signals. In these applications, the wear of conventional cables is particularly critical, and involves the provision of further oversizing and extra-lubrication, whereas lubrication in the inventive cable is optimized thanks to the lubricant distribution provided by the helical paddles formed by the fronts of the helical chambers as mentioned above.

As shown in FIG. 1, the respective centers of the circumferences of the strands or wires 101, 102, 103, are at the vertices of an equilateral triangle, as outlined in dashed lines, the center of gravity of such equilateral triangle corresponding to the longitudinal winding axis of the helicoid formed by the three strands or wires.

FIG. 3 shows the cable of the present invention when used in combination with a sheath 3 whose inside diameter is about equal to the diameter of the cylindrical envelope defined by the cross section of the cable 1. Particularly, as is visible in FIG. 3, for every cross section, the sheath 3 and the cable 1 have three lines of contact with each other, whose extension is substantially smaller than in prior art cables. Indeed, due to the great number of the strands or wires that compose prior art cables, the section thereof approximates a circumference, therefore a great number of points of contact exist between the cable and the sheath, which causes a high friction and wear.

For this reason, the cable of this invention provides a substantially lower friction than prior art cables and affords the advantages as described above.

Figure 4:
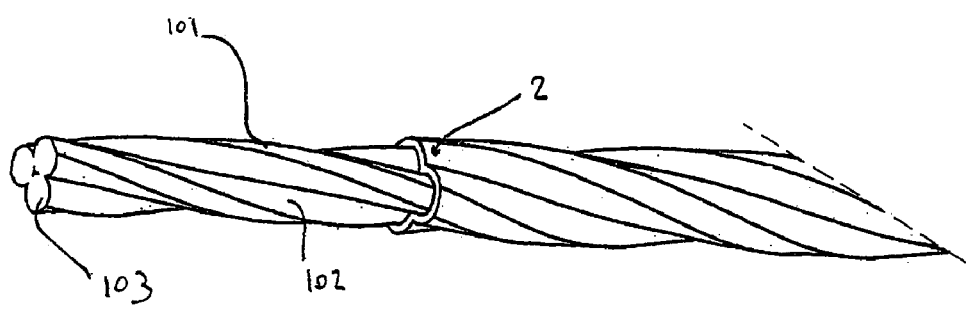
FIG. 4 is a perspective view of the cable of the present invention and the jacket.
Figure 5:
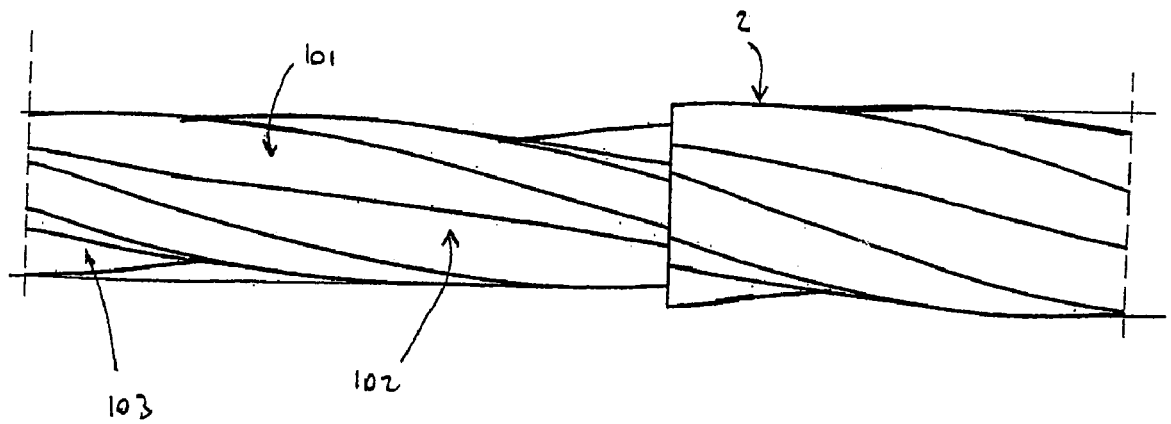
FIG. 5 is a plan view of the cable of the present invention and the jacket.
Figure 6:
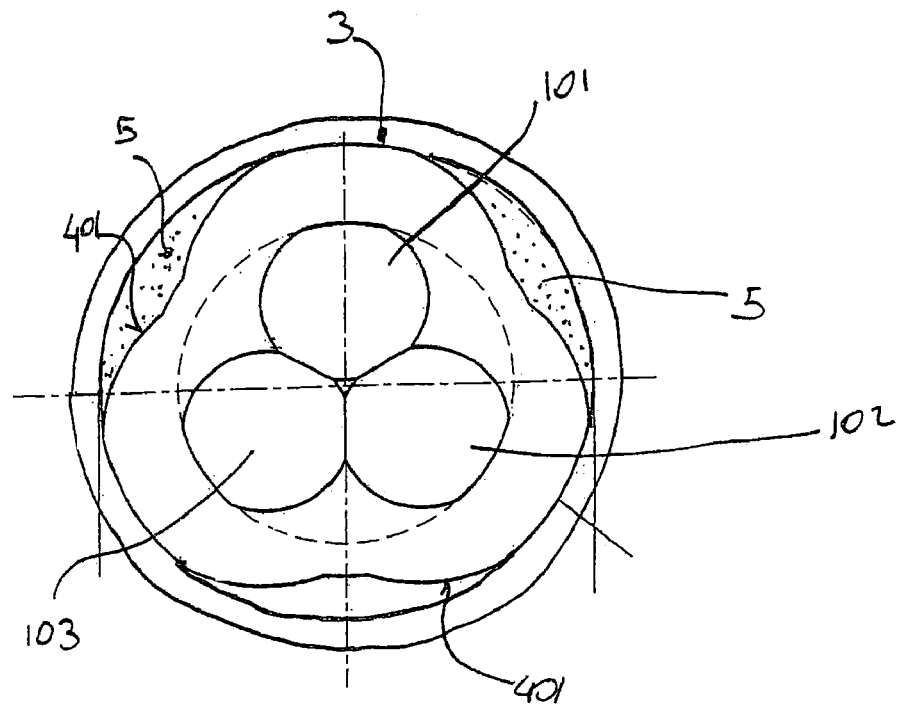
FIG. 6 is a sectional view of the cable of the present invention.

Moreover, in the inventive cable, a chamber is formed between two adjacent wires and the inner surface of the sheath 3, which chamber extends in a helical arrangement along the cable and is referred to as helical chamber 4, as shown in FIG. 4. According to a preferred embodiment, at least one of said helical chambers 4 may be arranged to contain or be supplied with a fluid lubricant 5, as shown in FIG. 6. Thus, the covered surface of each strand or wire, facing toward the corresponding helical chamber, acts as a feeding/spreading surface 401 for the fluid lubricant 5 contained in the associated helical chamber 4. Therefore, due to the relative motion between said cable 1 and said sheath 3, each helical chamber 4 containing said fluid lubricant acts as a chamber for pumping/distributing the fluid lubricant along the cable.

By this arrangement, the fluid lubricant is pushed and substantially evenly distributed and pumped all along the inner surface of the sheath 3 and, as a result, the inventive cable obviates prior art drawbacks, involving the use of better or oversized materials as compared with actual application requirements. Indeed, thanks to its lower friction, the cable of the invention allows to strictly use the materials and sizes that are determined by typical calculations related to the ability to exceed the mechanical stress, without substantially requiring any oversizing for wear resistance.

In accordance with a preferred embodiment, not shown, the cable of this invention may be comprised of such a number of strands or wires as to include, for every cross section, a small number of lines of contact with the associated sheath, and peripheral helical chambers for housing/distributing lubricant as well as helical surfaces for feeding/distributing said lubricant.

Once again, the strands will be helically wound to form fluid lubricant distribution chambers, delimited by the facing peripheral surface fronts of strands, whose radial depths, with respect to the maximum radius of the cylindrical envelope of the cable are such that said peripheral surface fronts face substantially forward with reference to a cable sliding direction, and form convex helical paddles for distributing the lubricant between the points of tangency of the cable and the inner surface of the sheath. Said helical paddle fronts so generated are convex and proportionally get closer to the sheath surface while exerting a compression force on the fluid lubricant as the cable slides inside the sheath. Also, the fronts extend along a portion of the whole radius of the inner cavity of the sheath and/or of the maximum radius of the cavity: from a maximum 50% to a minimum 10% of said maximum radius of the cavity and/or the radius of the cylindrical envelope defined by the cross section of the cable, as shown in the three-strand or wire arrangement in FIG. 6. More generally, these helical chambers are in the same number as the strands or wires of the cable.

According to a further characteristics, the strands or wires may have different diameters.

The fluid lubricant 5 may further have a cooling effect, for removing the heat generated by friction and/or help to remove the wear material built up in said chambers.

The invention claimed is:

1. A method for fabricating a stranded cable particularly for mechanical motion transmission comprising:
    winding strands or wires that form the stranded cable in a helical arrangement around a common longitudinal axis,
    flattening and smoothing the exterior profile of each strand of the stranded cable by hammering the stranded cable in hammering directions perpendicular to the longitudinal axis at hammering sectors having the shape of sectors of a circumference until the average diameter of the stranded cable after hammering is reduced to a diameter of about 80% to about 99.9% of the average diameter of the stranded cable before hammering,
    wrapping the stranded cable in a jacket,
    wherein wrapping the stranded cable comprises passing the stranded cable through an extruder supplied with plastic or PTFE, said stranded cable being wrapped in said jacket by extrusion of plastic or PTFE around the stranded cable in the extruder,
    wherein a chamber is formed between the jacket surrounding two adjacent wires and the inner surface of a sheath, and
    wherein the chamber has a helical arrangement along the stranded cable.

2. A method for fabricating a stranded cable as claimed in claim 1 wherein an exterior profile of the stranded cable, strands or wires, or said jacket assume a radius of curvature of an interior surface of said sheath, or a radius of curvature near to the radius of curvature of the inner surface of the sheath.

3. A method for fabricating a stranded cable as claimed claim 1 wherein the flattening and smoothing is obtained by hammering the stranded cable, strands or wires in two or more directions perpendicular to the longitudinal axis.

4. A method for fabricating a stranded cable as claimed in claim 1, further comprising: hammering the cable in at least four hammering directions.

5. A method for fabricating a stranded cable as claimed in claim 1, wherein the diameter of the cable after hammering is from 95% max. to 85% min. of the average diameter of the cable before hammering.

6. A method for fabricating a stranded cable as claimed in claim 1, wherein the diameter of the cable after hammering is about 92% of the average diameter of the cable before hammering.

7. A method for fabricating a stranded cable as claimed claim 1, wherein hammering is effected at two or more concave surfaces, each forming as a sector of a circle with a radius substantially identical or similar to the others, and acting in a radial direction, which surfaces form together a substantially circular surface.

8. A method for fabricating a stranded cable as claimed claim 1, wherein hammering is effected at two or more surfaces, each forming as a sector of a circle, and acting in a radial direction, the surfaces having different profiles, being flat and planar or concave.

9. A method for fabricating a stranded cable as claimed claim 1, wherein hammering is effected at two or more surfaces, each forming as a sector of a circle, and acting in a radial direction said surfaces having different radius of curvature along their extension.

* * * * *